E. G. HOFFMANN, DEC'D.
A. W. KIDDLE & A. M. BECKER, EXECUTORS.
FORMING DIES.
APPLICATION FILED FEB. 10, 1911.

1,106,564.

Patented Aug. 11, 1914.
2 SHEETS—SHEET 1.

E. G. HOFFMANN, DEC'D.
A. W. KIDDLE & A. M. BECKER, EXECUTORS.
FORMING DIES.
APPLICATION FILED FEB. 10, 1911.
1,106,564. Patented Aug. 11, 1914.
2 SHEETS—SHEET 2.
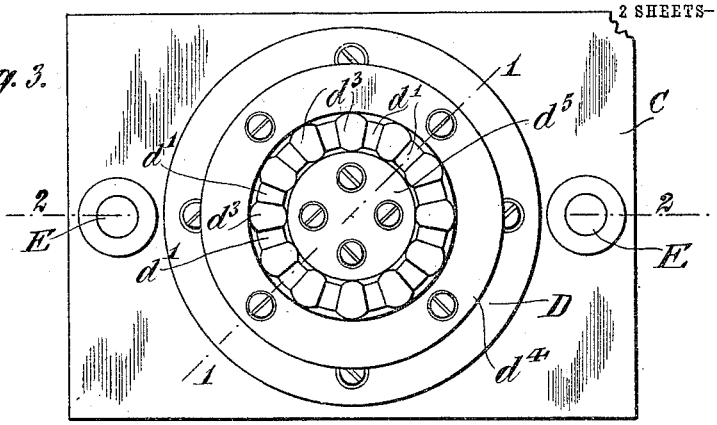
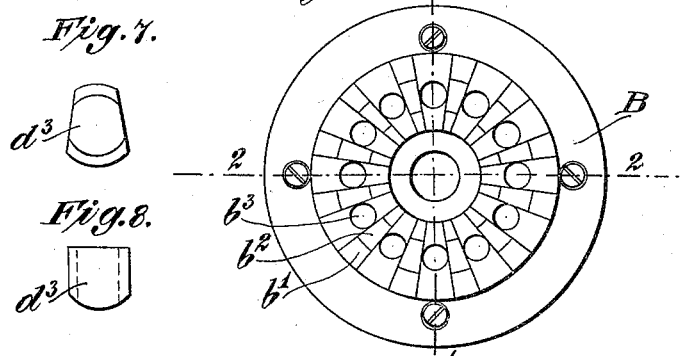
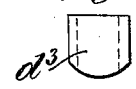
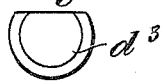
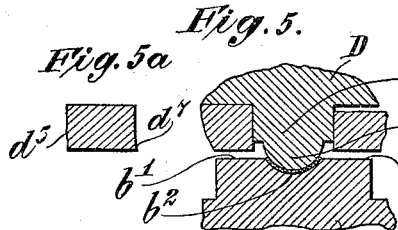
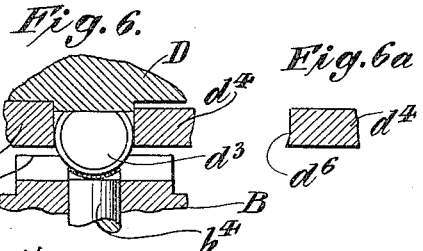
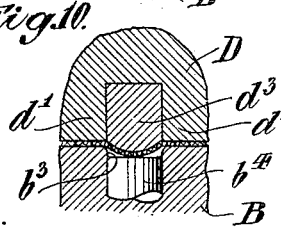
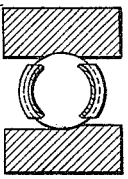
Witnesses:
Geo. Schwarz.
Sully Russo.
Applicants
Alfred W. Kiddle and Amalie M. Becker
Executors of Estate of Ernst G. Hoffmann,
Deceased.
By their Attorneys Kiddle & Wendell

UNITED STATES PATENT OFFICE.

ERNST GUSTAV HOFFMANN, DECEASED, LATE OF NEW ROCHELLE, NEW YORK, BY ALFRED W. KIDDLE, OF NEW YORK, N. Y., AND AMALIE MATHILDE BECKER, OF FRANKFORT-ON-THE-MAIN, GERMANY, EXECUTORS.

FORMING-DIES.

1,106,564.   Specification of Letters Patent.   Patented Aug. 11, 1914.

Application filed February 10, 1911. Serial No. 607,729.

*To all whom it may concern:*

Be it known that we, ALFRED WATTS KIDDLE, a resident of the borough of Manhattan of the city and State of New York, and AMALIE MATHILDE BECKER, a resident of the city of Frankfort-on-the-Main, Germany, (formerly AMALIE MATHILDE BAUMANN, of the city of New Rochelle, county of Westchester, and State of New York,) the executors named in the last will and testament of ERNST GUSTAV HOFFMANN, deceased, late a resident of the city of New Rochelle aforesaid, respectfully represent that the said ERNST GUSTAV HOFFMANN did make certain new and useful Improvements in Forming-Dies, of which the following is a specification, reference being had to the accompanying drawings, forming a part hereof.

The invention relates to forming dies and particularly such as are utilized to form the retaining or spacing rings described in a companion application entitled Cage for ball bearings, filed on even date herewith, Serial No. 607,730.

Figure 1:
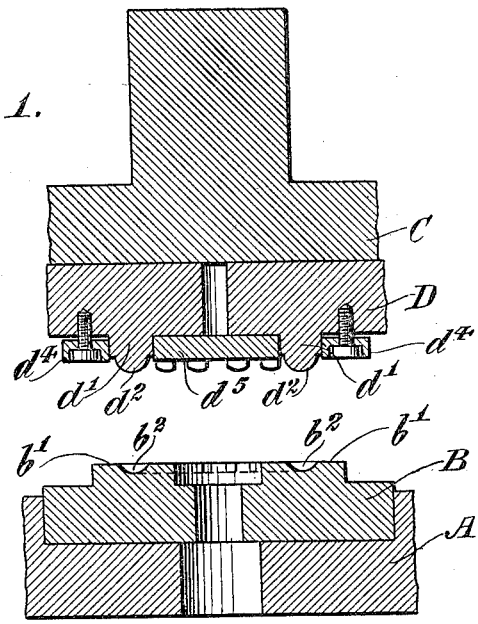
Figure 2:
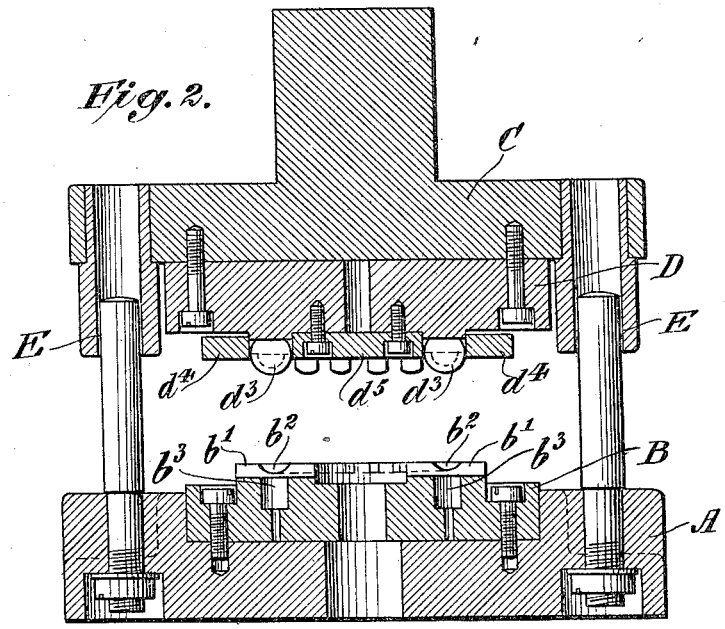

In said drawings which illustrate a simple and practical embodiment of the invention, Figure 1 is a section through those portions of the dies which form the neck portions of the retaining rings and the section is taken on line 1—1 of Figs. 3 and 4. Fig. 2 is a section taken through those portions of the dies which form the cup shaped portions of the retaining rings, in which the balls are seated and it shows a section taken on line 2—2 of Figs. 3 and 4. Fig. 3 is a view of the male die looking upward. Fig. 4 is a top view of the female die. Fig. 5 is an enlarged detail view through that portion of the die which forms the neck portion of the retaining ring. Fig. 5$^a$ is a detail cross sectional view of a ring for holding the ball in place which forms the cup-shaped portion of the retaining rings. Fig. 6 is an enlarged detail view through that portion of the die which forms the ball seat or cup-shaped portion of the rings. Fig. 6$^a$ is a detail cross sectional view of another retaining ring for holding in place the balls which form the cup-shaped portion of the rings. Figs. 7, 8, and 9 are plan, end, and side views of balls which have been flattened on the sides and top in order to adapt them for use in a forming die for forming the ball seating or cup-shaped portion of the retaining rings. Fig. 10 is a section of Fig. 3 through projections $d'$ $d'$ and a ball therebetween having the flattened sides and top. Fig. 11 is a sectional view of a race-way which utilizes a ball-bearing member having spacing rings such as may be formed in the dies described.

In said drawings A designates the anvil carrying the removable lower or female die B while C designates the movable plunger to which is secured the removable male die D. Between the anvil and plunger are the pin and socket guides E which insure proper registration of the dies.

The lower die comprises a series of spaced projections $b'$ having grooves $b^2$ therein in which the outer neck portions of the ball retaining rings rest during the shaping or formation thereof. Between these projections are a series of drilled holes $b^3$ into which the outer portions of the ball seating or cup-shaped portions of the rings can be forced. It is obvious that a removable member $b^4$ may be placed in these holes in order to constitute part of the shaping or forming surface of the lower die or to limit the amount in which the metal can be pressed into said holes should such be desired, but such member is not necessary in all cases.

The upper die comprises a series of spaced projections $d'$ having curved portions $d^2$ thereupon which force the metal which forms the neck portions of the rings into the grooves $b^2$ of the lower die. The upper die also comprises a series of balls $d^3$ flattened on their sides to engage the sides of the projections $d'$ (see Fig. 10) on the tops in order to provide a broad seat with the upper die body. These balls are secured in place between the projections $d'$ by outer and inner rings $d^4$ and $d^5$ which project somewhat below the center of curvature of the balls and which rings have ball engaging surfaces $d^6$ and $d^7$ at the lower portions thereof of nearly the same radius as the radius of the curved surface of balls as is indicated in Figs. 5$^a$ and 6$^a$. Due to this construction of the lower portions of the rings the balls can be firmly clamped between the rings and also forced upwardly against their seat on the body of the die member D. It will be observed that in the upper or male die the balls, flattened on the sides, and curved projections are alternately arranged and also that the radius of curvature of the face of the projections is substantially the same as the radius of the flattened sides of the balls at the place where the planes of said sides intersect the curved surface thereof.

It will be apparent that the construction shown discloses a simple and efficient die for making an irregular object and one which permits of ready removal or repair of the worn parts.

It is obvious that the words "upper" and "lower" as used in the specification are relative terms and that the position of the dies may be reversed or that the dies may be arranged in other than vertical alinement and still be within the scope of applicant's inventon. It is also obvious that other shapes than balls having flattened sides may be utilized and that various other forms and modifications may be made without departing from the spirit and scope of the invention.

What is claimed is—

1. The combination of a lower die having circularly arranged spaced projections providing recessed portions therebetween, and an upper die having circularly arranged spaced projections and removable forming members therebetween.

2. The combination of a lower die, and an upper die having a series of spaced projections and a series of removable forming members held in place therebetween by retaining members engaging opposite sides.

3. A pair of dies for forming ball-retaining or spacing rings, comprising a lower die, and an upper die having spaced projections carrying curved work-engaging surfaces and balls having their sides and tops removed located between the projections and held in place by inner and outer rings which extend below the center of curvature of the balls and engage that portion of the balls below said center.

4. The combination of an anvil, a plunger, dies carried thereby, and pin and socket guide members extending between the anvil and plunger, one of said dies having spaced projections forming members circularly arranged.

5. A combination of forming dies having a relative reciprocatory movement therebetween, one of which is provided with a series of recessed portions and the other of which is provided with a series of removable spaced members constituting forming projections held in place by holding plates on opposite sides of said spaced members, each of which plates engages at least a plurality of said members, the series of spaced members constituting projection-forming portions simultaneously coöperating with said series of recessed portions.

6. In a die, the combination of a series of members formed from balls and constituting a series of forming projections, and retaining members on opposite sides of the members formed from balls and engaging the last-mentioned members on opposite sides of a line passing through the center of curvature of the balls from which the die is located.

This specification signed the 29th day of December A. D., 1910 in the city of New York, in the State of New York, by ALFRED W. KIDDLE, and the 19th day of January A. D., 1911 in the city of Frankfort, Empire of Germany, by AMALIE MATHILDE BECKER.

ALFRED W. KIDDLE.
AMELIE MATHILDE BECKER.

Witnesses for Alfred W. Kiddle:
 G. McGRANN,
 EDWIN A. PACKARD.
Witnesses for Amalie Mathilde Becker:
 JEAN GRUND,
 CARL GRUND.

---

Copies of this patent may be obtained for five cents each, by addressing the "Commissioner of Patents, Washington, D. C."